United States Patent
Tehrani et al.

(10) Patent No.: US 11,663,384 B1
(45) Date of Patent: May 30, 2023

(54) TIMING MODELING OF MULTI-STAGE CELLS USING BOTH BEHAVIORAL AND STRUCTURAL MODELS

(71) Applicant: Synopsys, Inc., Mountain View, CA (US)

(72) Inventors: Peivand Tehrani, Campell, CA (US); Ahmed Shebaita, Fremont, CA (US); Li Ding, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/495,096

(22) Filed: Oct. 6, 2021

Related U.S. Application Data (60) Provisional application No. 63/091,274, filed on Oct. 13, 2020.

(51) Int. Cl.
  *G06F 30/3315* (2020.01)
  *G06F 111/20* (2020.01)
  *G06F 119/12* (2020.01)

(52) U.S. Cl.
  CPC ...... *G06F 30/3315* (2020.01); *G06F 2111/20* (2020.01); *G06F 2119/12* (2020.01)

(58) Field of Classification Search
  CPC ............. G06F 30/3315; G06F 2111/20; G06F 2119/12
  See application file for complete search history.

(56) References Cited

U.S. PATENT DOCUMENTS

| | | | | |
|---|---|---|---|---|
| 8,245,165 B1* | 8/2012 | Tiwary | ................ | G06F 30/3312 716/108 |
| 8,601,420 B1* | 12/2013 | Keller | ..................... | G06F 30/00 716/108 |
| 8,739,093 B1* | 5/2014 | Ye | ....................... | G06F 30/3312 716/108 |
| 9,026,965 B2* | 5/2015 | Mogal | ................... | G06F 30/398 716/108 |
| 9,928,324 B1* | 3/2018 | Keller | ................ | G06F 30/3312 |
| 11,023,640 B1* | 6/2021 | Keller | .................. | G06F 30/367 |
| 2009/0089729 A1* | 4/2009 | Ding | .................... | G06F 30/3312 716/113 |
| 2014/0096099 A1* | 4/2014 | Phillips | ................. | G06F 30/367 716/113 |
| 2015/0169819 A1* | 6/2015 | Hsu | ....................... | G06F 30/398 716/113 |
| 2015/0193569 A1* | 7/2015 | Tam | ....................... | G06F 30/398 716/113 |
| 2016/0070834 A1* | 3/2016 | Le | ....................... | G06F 30/3312 716/113 |
| 2017/0199956 A1* | 7/2017 | Gupta | ................ | G06F 30/3312 |

* cited by examiner

*Primary Examiner* — Nha T Nguyen
(74) *Attorney, Agent, or Firm* — Fenwick & West LLP (57) ABSTRACT

An equivalent input characterization waveform (EICW) is determined for a channel-connected block (CCB) located on a boundary of a cell, for a specific waveform of interest. The EICW and the specific waveform of interest produce a same timing characteristic of the CCB, but the EICW belongs to a set of waveforms on which a behavioral timing model for the multi-stage cell is based whereas the specific waveform of interest is not so limited. A timing response of the multi-stage cell is then estimated based on applying the EICW.

18 Claims, 8 Drawing Sheets

TIMING MODELING OF MULTI-STAGE CELLS USING BOTH BEHAVIORAL AND STRUCTURAL MODELS

CROSS-REFERENCE TO RELATED APPLICATION

This application claims priority under 35 U.S.C. § 119(e) to U.S. Provisional Patent Application Ser. No. 63/091,274, "Multi-Stage Cell Modeling in the Presence of Crosstalk," filed Oct. 13, 2020. The subject matter of the foregoing is incorporated herein by reference in its entirety.

TECHNICAL FIELD

The present disclosure generally relates to static timing analysis. In particular, the present disclosure relates to modeling of multi-stage cells, for example timing modeling in the presence of crosstalk.

BACKGROUND

The demand for low power consumption has pushed down the operating voltages of integrated circuits, which in turn has caused significant increase in analog effects such as backward Miller, resistance capacitance (RC) long tail and crosstalk effects. Typical behavioral timing models, such as nonlinear delay models (NLDM) and composite current source for timing models (CCST), describe the timing behavior of cells but do not retain enough information about the structure of the underlying cells to model these effects accurately. Structural models, such as composite current source for noise (CCSN) models, have the capability to model such effects because they retain enough information about the structure of the underlying cells but, because they are more computationally intensive, they are more suitable for gates with fewer transistors, such as inverters (INV), buffers (BUFF), NAND, NOR, AND, and OR gates.

As a result, complex gates and extracted timing models (ETMs), which are the cornerstone of current hierarchical flows, typically use the older NLDM, CCST or other behavioral modeling techniques. This is problematic especially for hierarchical designs, since it requires designers to use the behavioral models with higher margins in order to account for possible analog and other effects which are not accounted for by the behavioral models.

SUMMARY

In one aspect, an equivalent input characterization waveform (EICW) is determined for a channel-connected block (CCB) located on a boundary of a cell, for a specific input waveform of interest. The EICW and an actual waveform of interest produce a same timing characteristic of the CCB according to a structural model of the CCB, but the EICW belongs to a set of waveforms (the characterization waveforms) on which a behavioral timing model for the multi-stage cell is based, whereas the actual waveform of interest may have a different shape. A timing response of the multi-stage cell is then estimated based on applying the EICW.

For example, the EICW may be determined based on slew matching. A specific input waveform of interest is applied to a structural model of a first stage of a timing arc through a multi-stage cell. An output slew (Sout1) of the first stage is estimated based on this. The behavioral timing model for the multi-stage cell may be based on characterization waveforms that are different in shape than the input waveform of interest. The EICW is the characterization waveform that has the same output slew (Sout2) as the output slew Sout1 of the input waveform of interest. The output slew (Sfinal) of the entire timing arc through the multi-stage cell is then estimated, based on applying the EICW to the behavioral timing model.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to improving the accuracy of timing models (e.g., for delay, output slew and output waveforms) for multi-stage cells, based on behavioral timing models in timing libraries. A multi-stage cell includes multiple stages, for example multiple channel-connected blocks as described below. A behavioral timing model of a cell describes the timing behavior of the cell but without using the underlying structure of the cell as an input to the model. Behavioral timing models can be faster and can be used in hierarchical designs, but they are based on assumptions that can lead to inaccuracy.

For example, most behavioral timing models assume a certain parameterized shape for the input and output waveforms. The set of waveforms of that shape is referred to as the characterization waveforms, and the characterization waveforms form the basis on which the behavioral model is based. The characterization waveforms typically are also stored in the timing library, so the exact shape of the characterization waveforms are available. They are typically generated from a ramp with exponential tail.

If an input waveform to a cell has slew Sin with the assumed shape, then the output waveform of the cell will have slew Sout and the delay through the cell will be Dout, where Sout and Dout can be calculated using the behavioral model. The behavioral model may be simplified to a lookup table of Sout and Dout, as a function of Sin.

However, if the actual input waveform of interest does not have the specified shape, then the underlying assumptions are not correct and the corresponding estimates of output slew Sout and delay Dout may be inaccurate. This inaccuracy may be reduced by applying equivalent input characterization waveforms (EICW) to the behavioral model, rather than applying the actual input waveform to the behavioral model. The EICW for a stage is the characterization waveform that, according to the structural model, results in an output slew for that stage, that matches the output slew estimated for the actual input waveform. In the above example, the input slew of the EICW is used, rather than the input slew of the actual input waveform.

In one aspect, an arc (path) through a multi-stage cell includes multiple stages, including a first stage and a last stage. Examples of stages are channel-connected blocks (CCB). A CCB is a block of circuitry, where all of the signal inputs to the block drive transistor gates in the block, and all of the signal outputs from the block drive transistor gates of other blocks (or primary outputs). Each input/output has its own CCB. They may be cell arc or pin based.

A library that characterizes the multi-stage cell includes structural models for the boundary stages of the cell, for example composite current source for noise (CCSN) models of the first and last stages. The library also includes behavioral timing models for the cell, for example nonlinear delay models (NLDM) and/or composite current source for timing models (CCST).

A structural model of the first stage of the arc and the actual input waveform of interest are used to estimate an output slew (Sout1) of the output waveform from the first stage. The EICW for the first stage is determined based on matching the output slew Sout1. The EICW for the first stage is the characterization waveform that, according to the structural model, results in an output slew (Sout2) for the first stage, that matches the output slew Sout1 estimated for the actual input waveform. The slew (Sfinal) of the output waveform of the entire arc through the multi-stage cell may then be estimated, based on applying the EICW to the behavioral timing model of the arc.

Delay through the arc may be similarly estimated. The delay through the first stage may be estimated in two ways: delay (Dout1) based on the structural model and the actual input waveform, and delay (Dout2) based on the structural model and the slew-based EICW for the first stage. The delay of the entire arc may then be estimated based on the EICW for the first stage and the behavioral model of the arc, and adjusting for the difference Dadj between Dout1 and Dout2.

An analogous approach may be used with the last stage of the arc to estimate the output waveform, including coupled interconnect delay. An EICW for the last stage may be determined by matching slews using a structural model of the last stage. The output slew of the last stage is known (e.g., Sfinal estimated above). The EICW for the last stage is the characterization waveform that, according to the structural model, results in an output slew for the last stage that matches the output slew Sfinal. The EICW for the last stage may be used with a structural model of the last stage to estimate the output waveform of the last stage. A coupled interconnect delay for the given load may also be estimated using the EICW and the structural model of the last stage.

The present approach described herein can have many advantages. The use of behavioral models to describe behavior across the entire cell can be more compact and faster to compute, especially for larger cells with many stages along each arc. It also is more suitable for hierarchical designs, since structural details of lower level components in the hierarchy may be abstracted away in the higher level components. On the other hand, the use of structural models on the boundary stages of these cells can enable analysis of analog waveform effects for gate level analysis and can produce more accurate results for a variety of different input waveforms and loadings, including coupling to aggressor nets. Thus, the present approach described herein combines the usage of behavioral models (e.g., NLDM, CCST) and structural models (e.g., pin based CCSN models) to improve the accuracy of timing calculation of complex gates with arbitrary input waveforms and loading including cross coupling from aggressor nets, while also reducing the computational load.

Another advantage of this approach is that, for certain embodiments, the behavioral models and structural models are already stored in a timing library. It does not require additional characterization constructs in the timing library and can make use of models that were previously stored in the timing library to improve the accuracy of timing calculations.

Figure 1A:
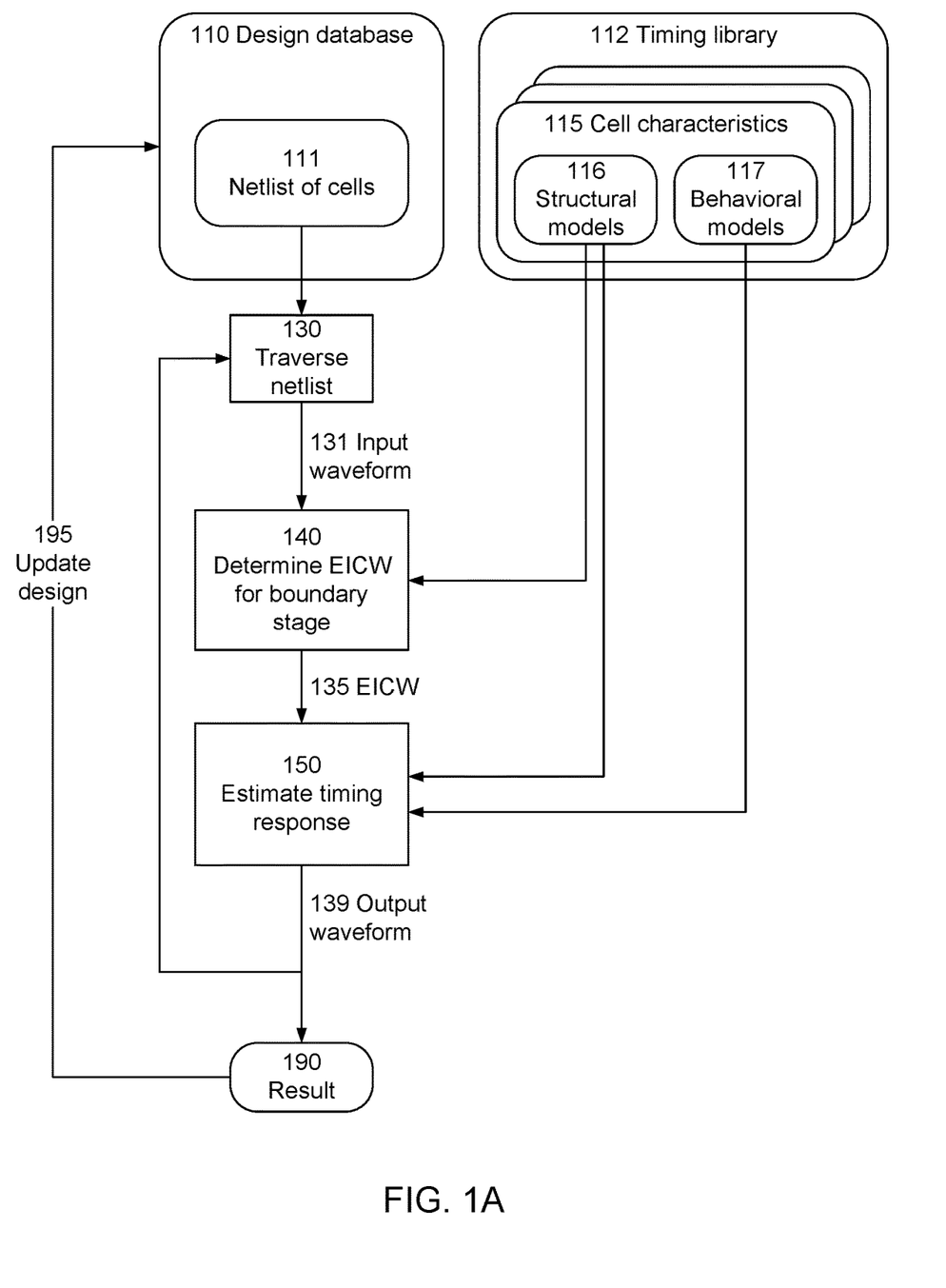
FIG. 1A depicts a flow chart for timing modeling of an integrated circuit.

FIG. 1A depicts a flow chart for timing modeling of an integrated circuit. The design of the integrated circuit is stored in a design database 110. The design database 110 is includes a netlist 111 of cells. The cells are described in a cell library, and the portion that describes cell timing characteristics 115 of the cells is referred to as the timing library 112.

Figure 1B:
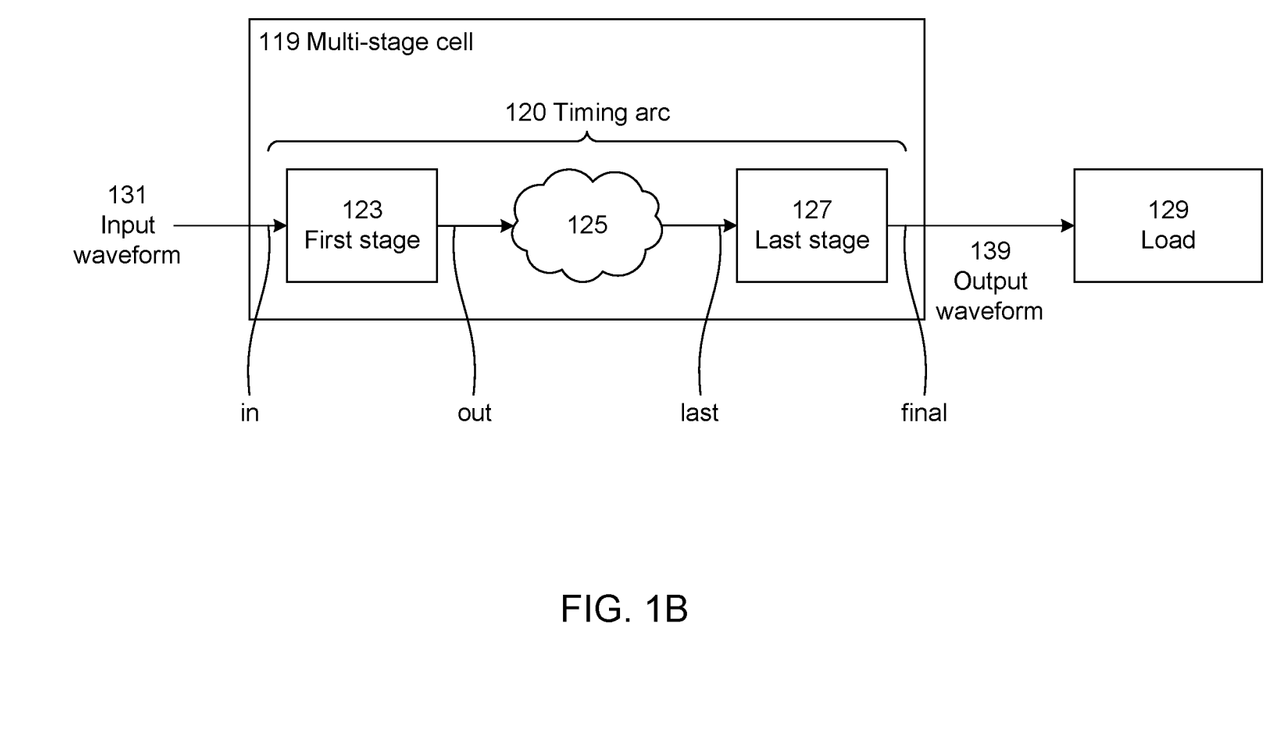
FIG. 1B depicts a multi-stage cell with coupled loading.

More complex cells may be multi-stage cells, as shown in FIG. 1B. In a multi-stage cell 119, a timing arc 120 through the cell includes multiple stages. Each stage may be a channel-connected block (CCB), as described previously.

FIG. 1B shows the first stage 123 and last stage 127 of timing arc 120, and all the intermediate stages 125 are shown as a cloud. There may be many intermediate stages 125. This reflects the information contained in the timing library 112. The cell timing characteristics 115 include structural models 116 of the boundary stages (e.g., first and last stages 123, 127) and behavioral models 117 of the multi-stage cell 119 as a whole. As described below, structural information about the interior stages 125 is not used in timing analysis and is not required to be retained in the timing library 112. This reduces the size of the timing library 112 and accelerates the timing analysis of the integrated circuit design.

In FIG. 1B, the multi-stage cell 119 is driven by input waveform 131 and produces an output waveform 139. The multi-stage cell 119 is the driver cell with respect to its load 129. The individual cells within load 129 that are driven by the multi-stage cell 119 may be referred to as receiver cells, and the load may be affected by crosstalk from other nets.

Returning to FIG. 1A, timing analysis is performed by traversing the cells in the netlist, at 130. The input waveform 131 of interest may be generated from a previous cell or from a primary input. For multi-stage cells, the timing response to the input waveform 131 of interest is analyzed, as follows. The behavioral models 117 are defined with respect to a set of characterization waveforms. The actual input waveform 131 of interest and the actual waveforms propagating through the cell may not belong to this set. An EICW for a CCB on a boundary of the cell is determined based on the actual waveforms of interest, at 140. With respect to FIG. 1B, EICWs may be determined for the first stage 123 and/or the last stage 127. The EICW is the characterization waveform that is equivalent to the actual waveform of interest because the two waveforms produce the same timing response through the stage. The structural models 116 may be used to determine this equivalence. In the more detailed example of FIG. 3 below, the EICW is determined based on matching output slew.

The output waveform 139 and timing response 190 of the cell is then determined by applying the EICW 135 to estimate the timing characteristic of interest, at 150. For example, the behavioral model 117 may be used with the EICW of the first stage to estimate output slew and propagation delay through the cell. As another example, the structural model of the last stage may be used with the EICW of the last stage to estimate the output waveform shape, which may then be used as the actual input waveform to the next cell.

The timing analysis results 190 may be used to update the design, at 195. This may include attaching appropriate cell/net delays, slews and/or waveforms to the timing graph of the design. Later delays may be added to construct path delays and to report best and worst timing paths to designers.

Figure 2:
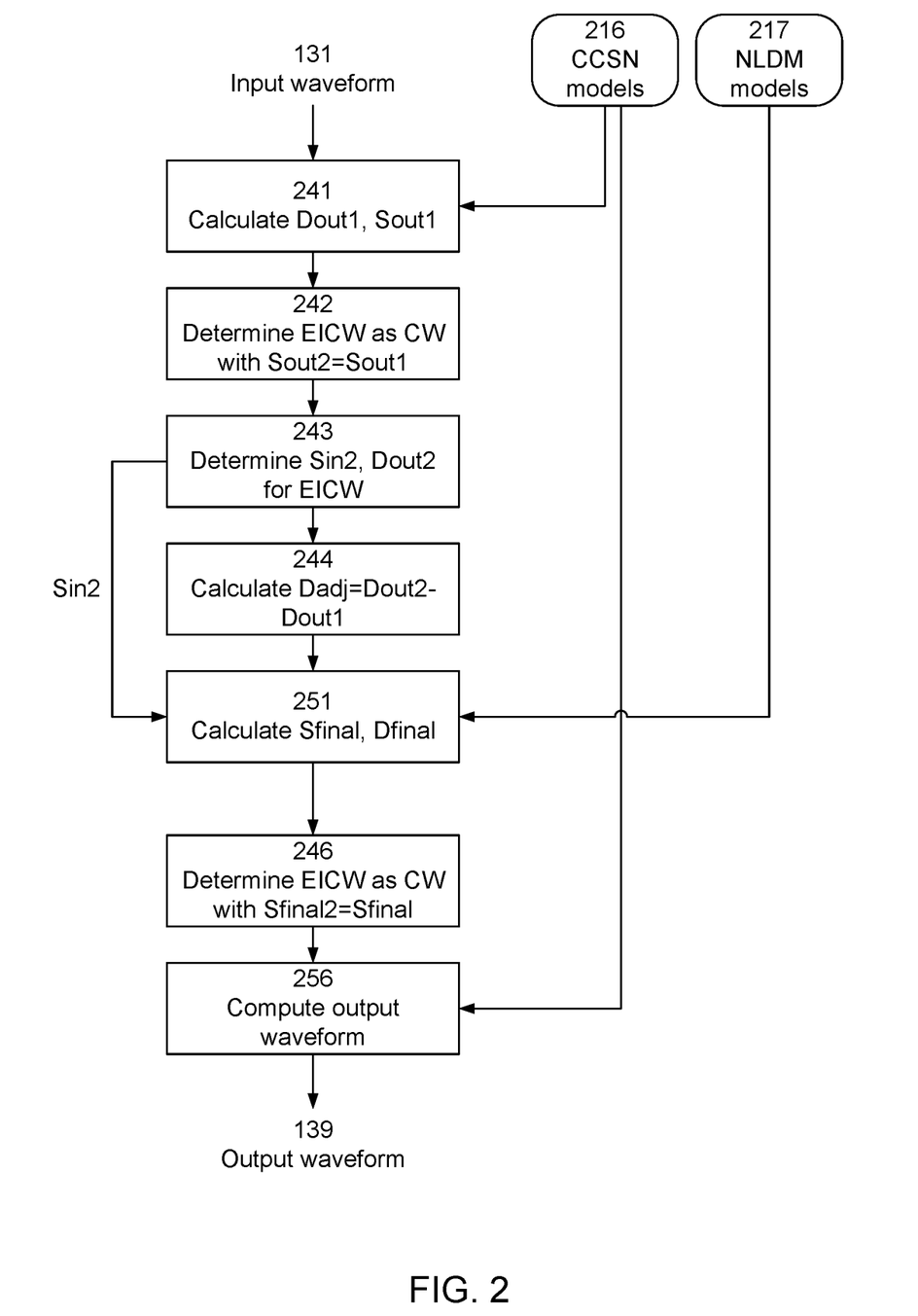
FIG. 2 depicts a flow chart for timing modeling of a multi-stage cell.

FIGS. 2-5 depict a more specific example. FIG. 2 shows an example of the steps between input waveform 131 and output waveform 139 of FIG. 1A. In the following, the first stage 123 may be referred to as channel-connected block A (CCBA) and the last stage 127 as channel-connected block K (CCBK). The variable names take the form XYN. X is either "S" for slew or "D" for delay. Y is "in" "out" "last" or "final" to indicate different points on the timing arc, as shown in FIG. 1B. That is, Sin is the slew of the input waveform of interest 131, also input to CCBA. Sout is the slew of the output waveform from the first stage 123 (CCBA). Slast is the slew of the input waveform to the last stage 127 (CCBK). Sfinal is the slew of the output waveform 139 of the cell, which is also the output waveform of the last stage 127 (CCBK). Dout is the propagation delay through the first stage 123, and Dfinal is the propagation delay through the timing arc 120. N is either "1" for structural model response to the actual input waveform or "2" for structural model response to the EICW.

In this example, the behavioral models 217 include nonlinear delay (NLDM) models and/or composite current source for timing (CCST) models. In NLDM models, driver cell output slews and arc delays are modeled as a function of input slew and output load:

$$\text{Sfinal}=\text{SNLDM}(\text{Sin},\text{Ceff}) \tag{1A}$$

$$\text{Dfinal}=\text{DNLDM}(\text{Sin},\text{Ceff}) \tag{1B}$$

where SNLDM is the function defining output slew Sfinal, DNLDM is the function defining propagation delay Dfinal, and Ceff is the capacitive loading of the output load 129. Lookup tables may be used to implement NLDM models.

In CCST models, driver cell output current waveforms 139 are captured as vectors, as a function of input slew Sin and capacitive output load Ceff. Receiver cell loading is modeled as multiple capacitance values as a function of receiver input slew and output load. Lookup tables may be used to implement CCST models.

In this example, the structural models 216 include composite current source for noise (CCSN) models. In these models, both driver and receiver cell arcs are modeled using current tables as a function of input and output voltages. CCSN modeling may include extra modeling quantities like Miller capacitance and CCSN input/output waveforms.

Data for the above mentioned models are often captured in timing libraries, such as using the standard Liberty format from SYNOPSYS®. NLDM, CCST and other behavioral models typically are based on predefined library characterization waveforms. These modeling techniques could be used in standalone form or combined together. For example, NLDM slew table lookups can be used as initial estimate of cell output slew, which would be used for estimating the receiver capacitance values. These estimates could later on be refined to improve the accuracy of the calculation.

CCSN data for the first and last stages are used to improve the timing calculation accuracy of multi-stage cells. CCSN data for the first stage CCBA is used to model the input waveform impact such as backward Miller and long RC tail on multi-stage cell delay and slew computation. CCSN data for the last stage CCBK is used to model crosstalk delay and receiver backward Miller effect impact on the multi-stage cell.

Coupled interconnect, including the aggressor circuitry, is connected to the last stage CCBK, using CCSN data for the analysis. The multi-stage cell is modeled by augmenting behavioral models (NLDM, CCST) for the multi-stage cell 119 with structural models (CCSN) for the first stage CCBA and the last stage CCBK.

The CCBA response to the actual input waveform is used to compute an EICW that produces a similar voltage waveform at the CCBA output. This EICW is used with behavioral models for cell delay and slew computation, as well as delay adjustments due to input waveform shape deviations from the characterization waveform.

Analogously, on the output side, CCBK is used to compute another EICW at its input. Using CCBK structural model along with this EICW enables the accurate delay calculation including crosstalk analysis for the net connected to the CCBK cell output.

Figure 3A:
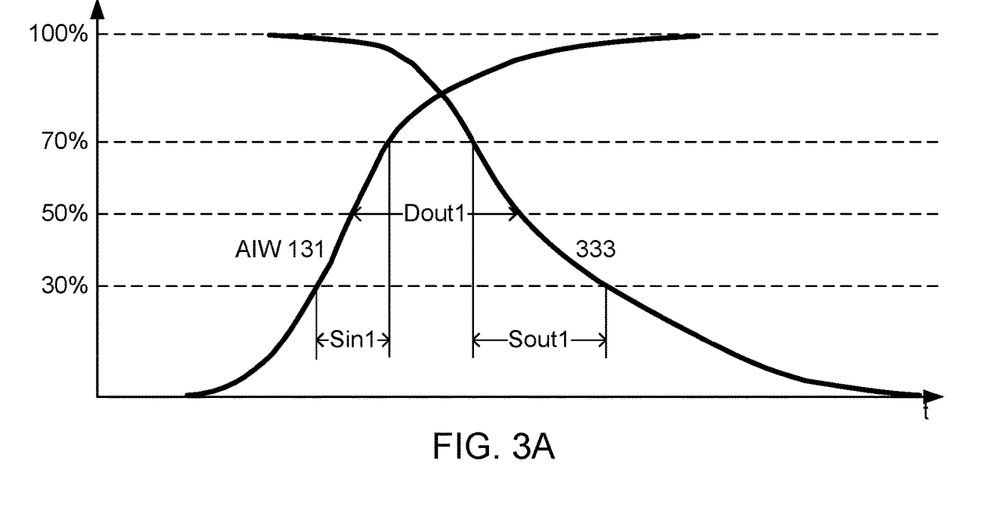
FIGS. 3A and 3B depict a process for determining the EICW of an actual input waveform, based on output slew matching.

FIG. 2 depicts a flow chart for timing modeling of a multi-stage cell, including the different aspects described above. The process shown in FIG. 2 is executed by an EDA system. The EDA system gets inputs: the actual input waveform (AIW) of interest 131, and CCSN models of CCBA and CCBK. At 241, the system computes the CCBA delay (Dout1) and slew (Sout1) using the actual input waveform 131, as shown in FIG. 3A. In more detail, the CCSN model of the first stage CCBA is used to estimate the output waveform 333 of the first stage produced by the AIW 131. This output waveform 333 has slew Sout1 and delay Dout1. In this example, slew S is defined as the time between the 30% and 70% points of the waveform, and delay D is defined as the time between the 50% crossing points of the input and output waveforms, as shown in FIG. 3A. The AIW 131 has slew Sin 1.

Figure 3B:
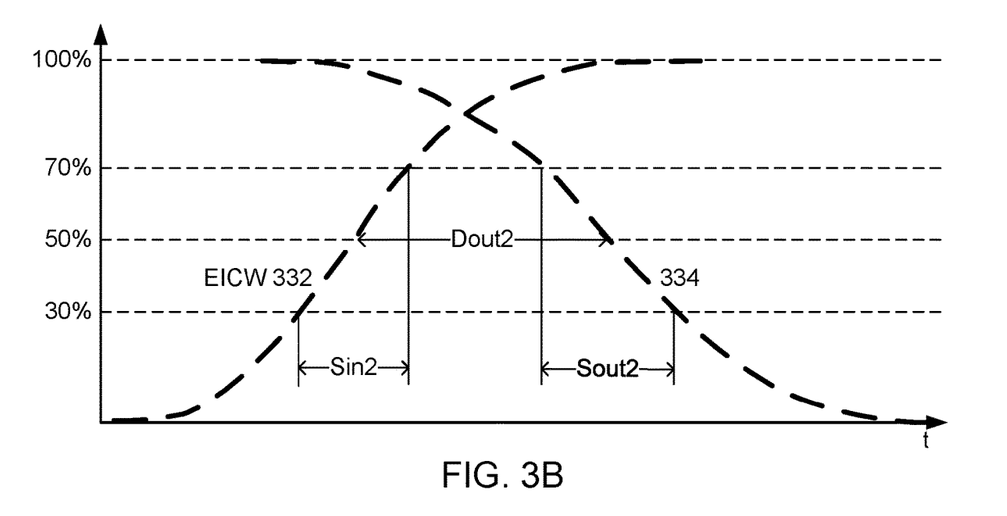

At 242, the system determines the EICW for the first stage CCBA, which is the characterization waveform that has output slew Sout2 that matches Sout1, as shown in FIG. 3B. In practice, Sout2 and Sout1 may not be exactly equal, but will match to within some tolerance (e.g., see FIG. 4). It should be understood that "Sout2=Sout1" does not require exact equality. The EICW 332 has an input slew of Sin 2, which according to the structural model of CCBA produces output slew Sout2 at the CCBA output, with Sout2=Sout1. The corresponding delay is Dout2. Sout2 is the output slew predicted by a structural model of first stage CCBA, and the predefined characterization waveform that satisfies Sout2=Sout1 is the EICW 332 for the first stage. In FIG. 3B, an equivalent output characterization waveform 334 has the same slew as the actual output waveform 333. The EICW 332 is the characterization waveform that produces the equivalent output characterization waveform 334.

The EICW 332 has slew Sin 2 and delay Dout2, as determined based on the CCSN model of the first stage CCBA, at 243. The delay Dout2 may be different than delay Dout1. At 244, the EDA system computes the delay adjustment as $$Dadj=Dout2-Dout1 \quad (2)$$

At 251, the EICW is used to calculate to calculate the cell output slew (Sfinal), cell delay (Dfinal), and output net effective capacitance (Ceff) based on Eqns. 1A and 1B above:

$$Sfinal=SNLDM(Sin\ 2,Ceff) \quad (3A)$$

$$Dfinal=DNLDM(Sin\ 2,Ceff)-Dadj \quad (3B)$$

Effects of the last stage CCBK are also accounted for by finding the EICW for the last stage. With respect to CCBK, the output slew is Sfinal. The EDA system determines the EICW for the last stage CCBK, at 246. The input slew for the EICW is Slast2. The EICW for the last stage is the characterization waveform for the last stage, which produces an output slew Sfinal2 that matches Sfinal. At 256, the system determines the actual output waveform by applying the EICW through the last stage CCBK, based on the CCSN model of the last stage CCBK. This may result in an actual output waveform that is different in shape than the characterization waveform with slew Sfinal. This approach can be used to account for coupled interconnect delay. The EICW and CCBK are connected to the coupled interconnect at the cell output of CCBK for coupled and uncoupled receiver waveform computations (coupled and uncoupled net delay and slew under actual RC loading). That is, those computations are made using the structural model of the last stage (CCSN model of CCBK), the load on the last stage, and the EICW for the last stage (e.g., defined by Slast2).

Figure 4:
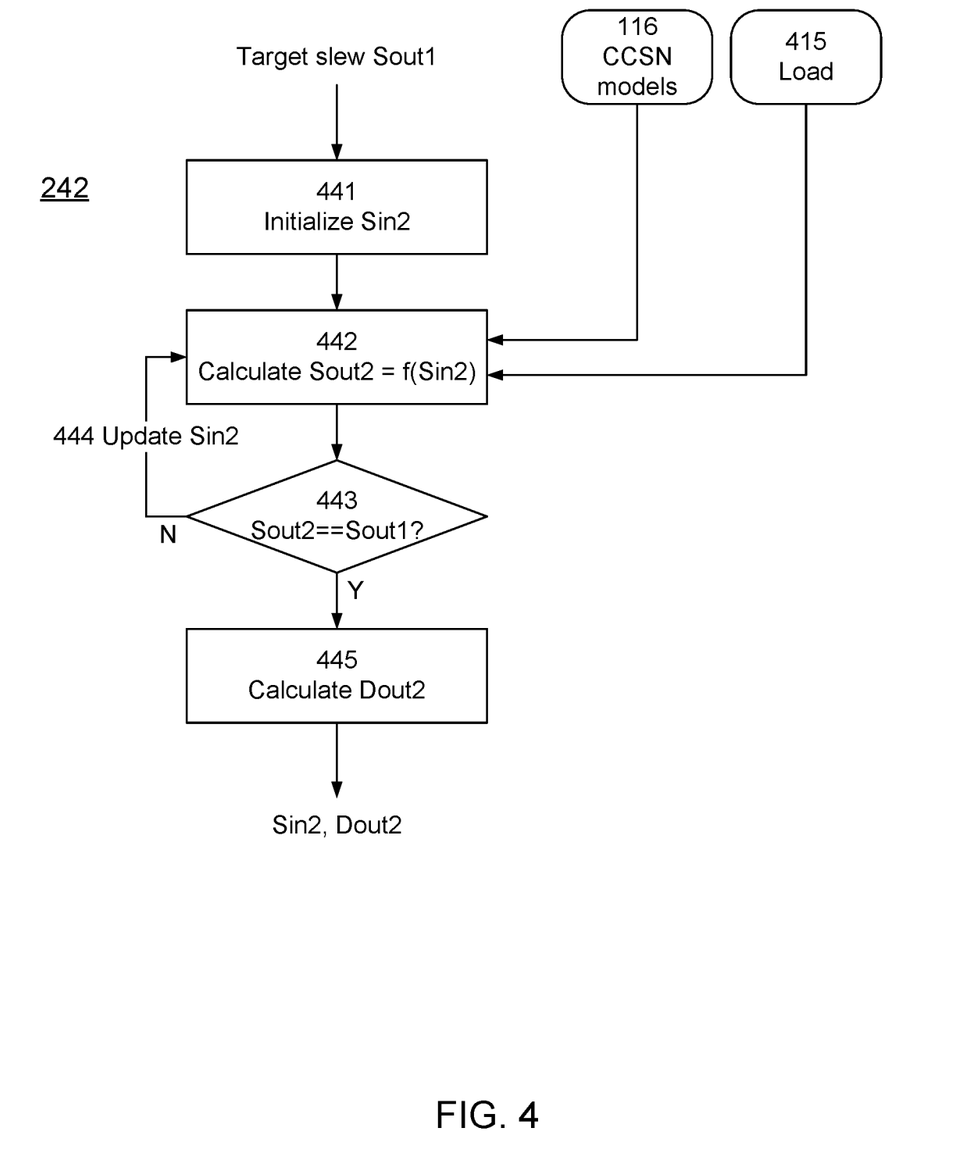
FIG. 4 depicts a flow chart for iterative solution finding of the EICW.

At 242 and 246 of FIG. 2, the EICW of a stage is determined by slew matching. The output slew of the stage (CCB) is known or can be calculated, and the EICW is the characterization waveform which products an output waveform with the same slew. FIG. 4 depicts a flow chart for iterative solution finding of the EICW, using step 242 as an example.

The inputs to FIG. 4 are target slew Sout1, structural model 116 of CCBA and the CCBA loading 415, which is also contained in the timing library. At 441, the system selects an initial guess for the EICW, as defined by input slew Sin 2. Using the input slew Sin 2, the CCB structural model 116 and CCB loading 415, the system computes the output slew Sout2, at 442. At 443, if Sout2=Sout1, the iterative solution finding is completed. The EICW is defined by input slew Sin 2 and the delay Dout2 may be calculated 445. If Sout2 and Sout1 are not sufficiently matching, then the solution is iterated by updating the input slew Sin 2 to an updated value, at 444. Techniques such as Newton-Raphson may be used to update the slew Sin 2 at 444.

The iterative solution finding step may be time-consuming. Each iteration invokes a time-stepping algorithm that could lead to significant impact on runtime. The runtime of the iterative solution finding can be improved significantly based on the knowledge that in typical gate level designs, an individual multi-stage library cell is instantiated many times. In that case, the iterative solution finding may be performed once for the library cell prior to the start of the timing analysis, rather than for every instantiation of the library cell.

Since prior to the timing analysis, the exact input slew Sin 1 and capacitive loading Ceff of the multi-stage library cell is not known, the process of iterative solution finding uses a wide range of input slews and output loads. This range is readily available through NLDM delay and slew tables using slew and load breakpoint values.

For each first stage of a multi-stage library cell, two single-dimensional lookup tables are created that describe CCBA output delay (Dout2) and input slew (Sin 2) as a function of the library cell CCBA output slew (Sout2=Sout1). For the first stage, the load Ceff is internal to the cell so it does not change and does not require an extra dimension in the lookup table (LUT).

$$Sin\ 2=LUT1(Sout1) \quad (4A)$$

$$Dout2=LUT2(Sout1) \quad (4B)$$

For each last stage of the multi-stage library cell, a single two-dimensional lookup table is created that describes CCBK input slew (Slast2) as a function of the library cell CCB output slew (Sfinal) and loading:

$$Slast2=LUT3(Sfinal,Ceff) \quad (4C)$$

Slast2 defines the EICW for the last stage. These lookup tables are stored and used later during timing analysis instead of the iterative solution finding in FIG. 4, resulting in significant runtime improvement for this modeling approach. Note that these tables may have different values depending on rising/falling direction of waveforms.

Figure 5:
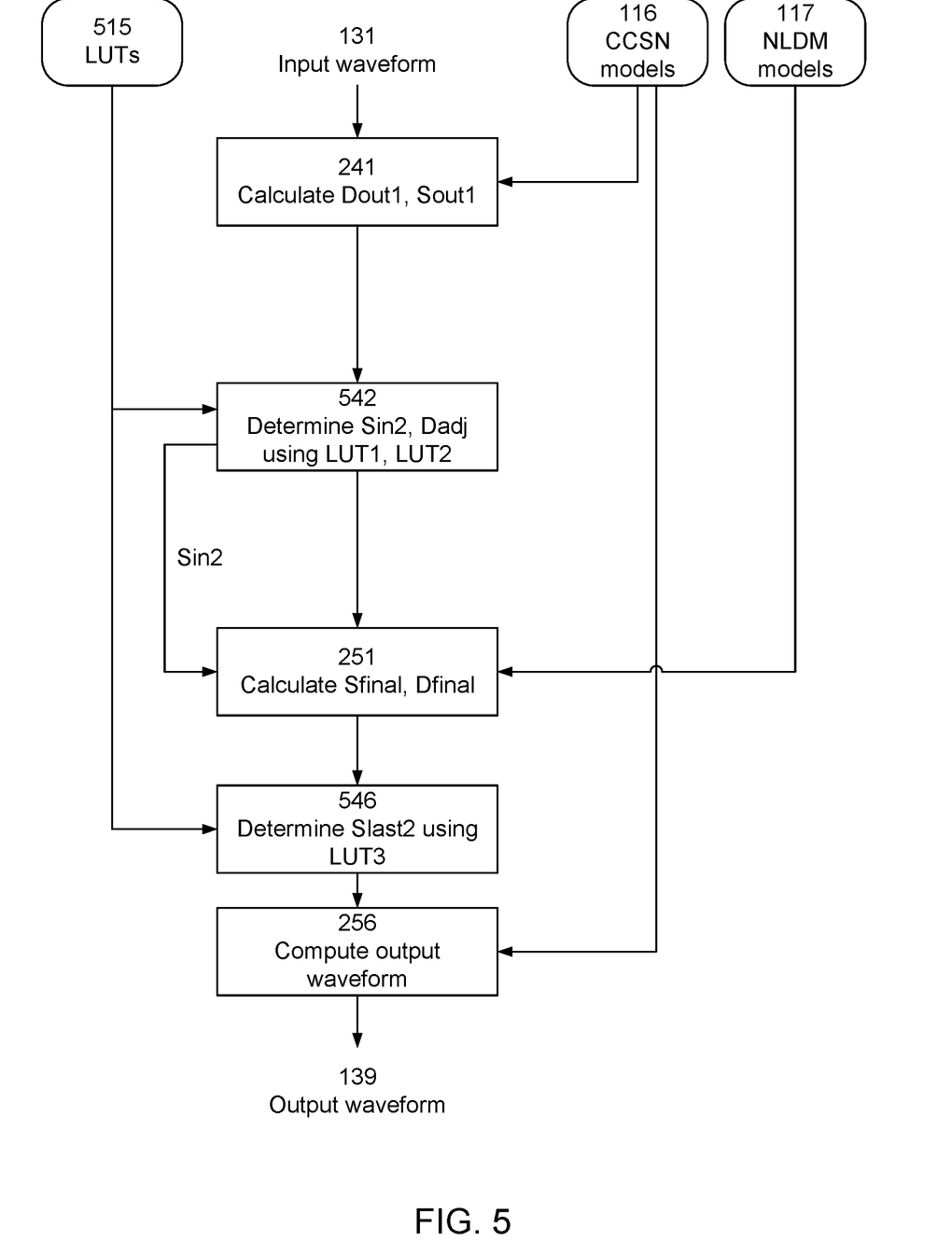
FIG. 5 depicts a flow chart for timing modeling of a multi-stage cell, using lookup tables.

FIG. 5 shows the flow of FIG. 2, but expressly showing the use of lookup tables 515. Comparing the flows of FIGS. 5 and 2, steps 242-244 is replaced by step 542 using LUT1 and LUT2 above. In addition, step 246 is replaced by step 546 using LUT3 above.

Figure 6:
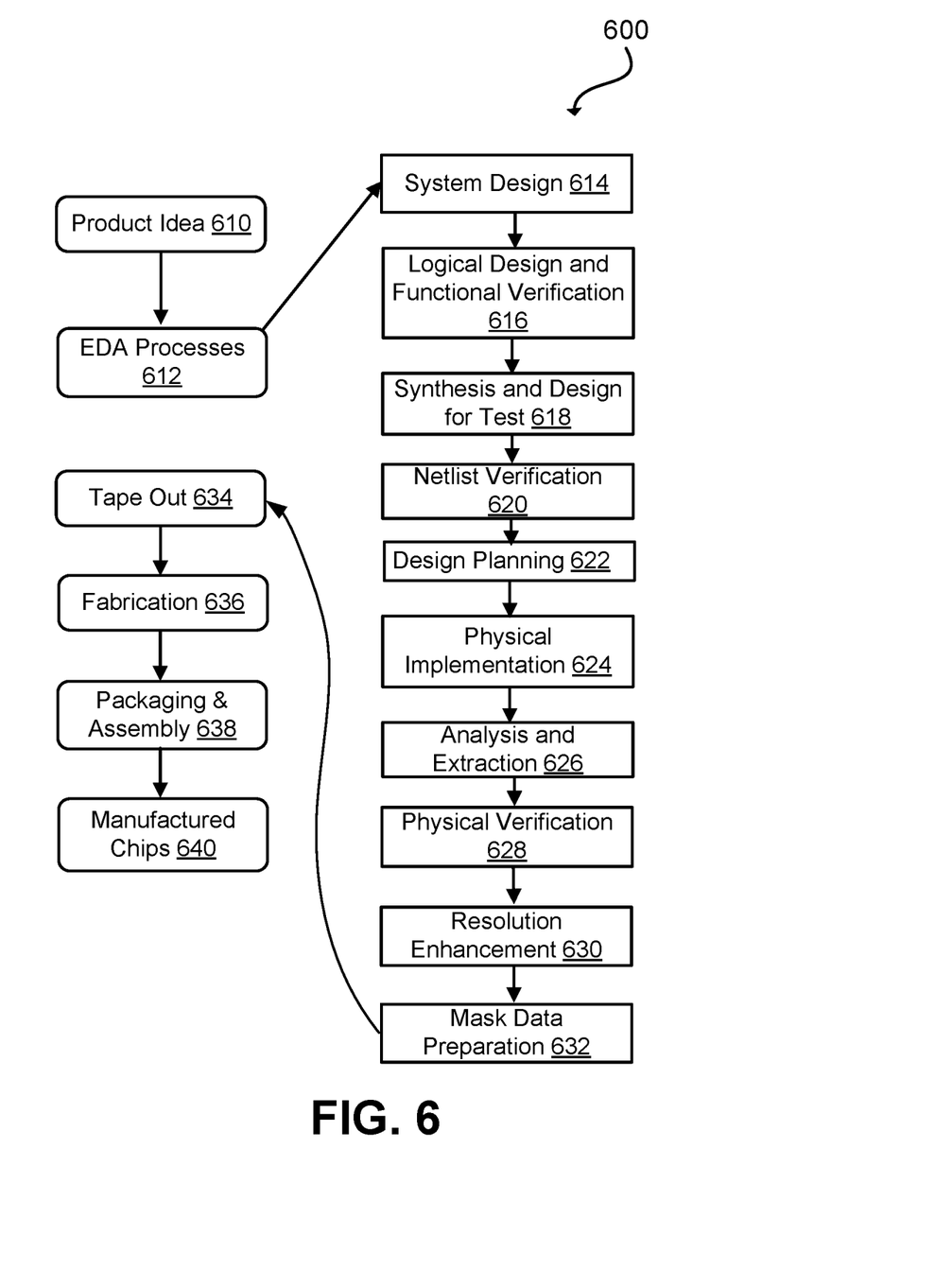
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
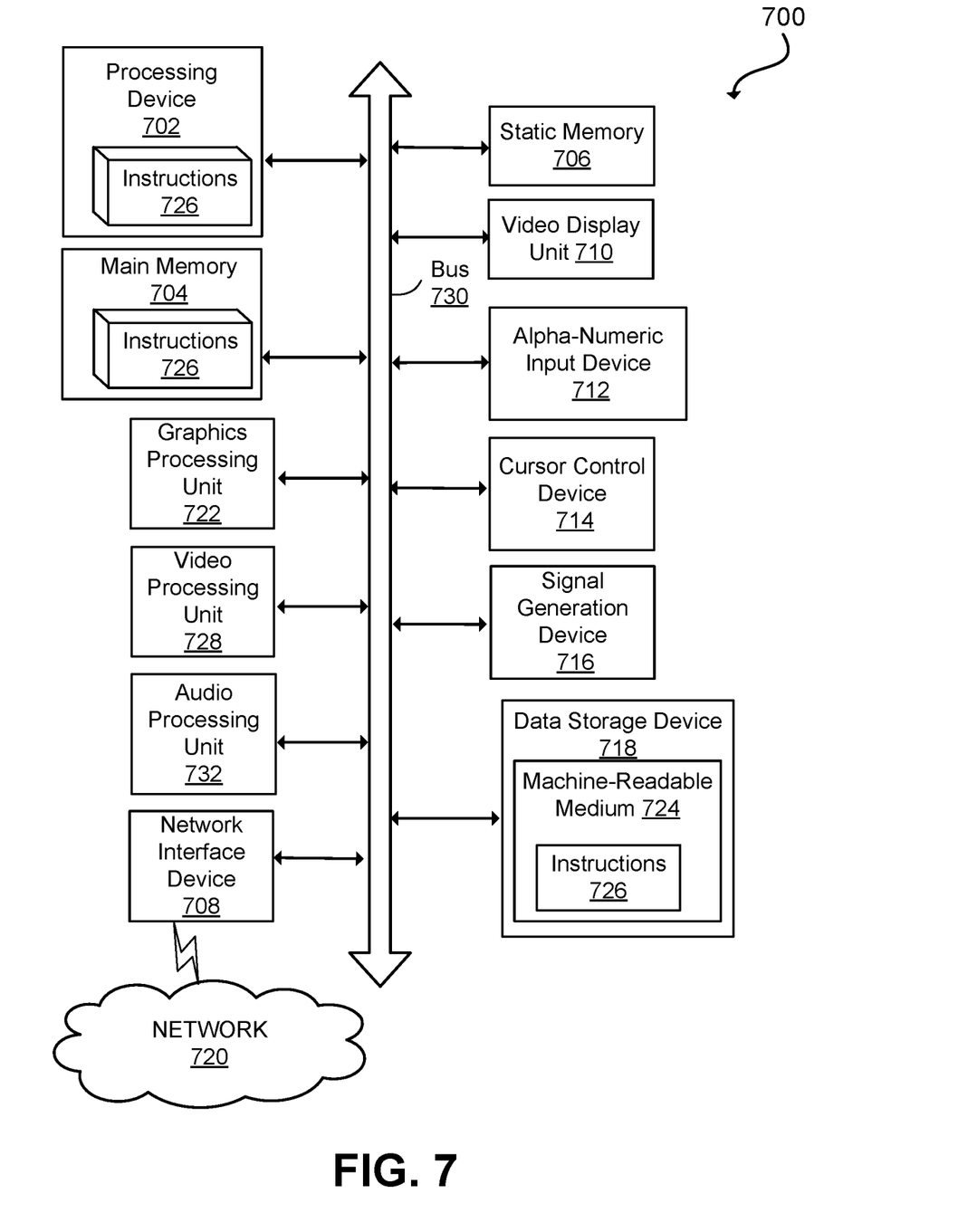
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   estimating an output slew (Sout1) of an output waveform of a first stage of a timing arc through a multi-stage cell, based on a structural model of the first stage and an input waveform to the first stage;
   determining, by a processor, a first equivalent input characterization waveform (EICW) having an output slew (Sout2) for an output waveform of the first stage that matches Sout1, wherein the first EICW belongs to a set of characterization waveforms on which a behavioral timing model for the multi-stage cell is based; and
   estimating an output slew (Sfinal) of an output waveform of the timing arc, based on applying the first EICW to the behavioral timing model.

2. The method of claim 1 further comprising:
   estimating a difference in delay (Dadj) between (a) a timing delay through the first stage using the input waveform, and (b) a timing delay through the first stage using the first EICW; and
   estimating a delay (Dfinal) through the timing arc, based on a delay estimated by the behavioral timing model and adjusted by Dadj.

3. The method of claim 1 wherein the timing arc further comprises a last stage, and the method further comprises:
   determining a second EICW for the last stage having an output slew for an output waveform of the last stage that matches Sfinal; and
   estimating a coupled interconnect delay for the timing arc based on a structural model of the last stage, a load on the last stage, and the second EICW.

4. The method of claim 1 wherein the timing arc further comprises a last stage, and the method further comprises:

determining a second EICW for the last stage having an output slew for an output waveform of the last stage that matches Sfinal; and estimating the output waveform of the timing arc, based on a structural model of the last stage, a load on the last stage and the second EICW.

5. The method of claim 1 wherein the behavioral timing model for the multi-stage cell determines output slew of the multi-stage cell as a function of input slew to the multi-stage cell and output load driven by the multi-stage cell.

6. The method of claim 1 wherein the behavioral timing model for the multi-stage cell determines output current of the multi-stage cell as a function of input slew to the multi-stage cell and output load driven by the multi-stage cell.

7. The method of claim 1 wherein the structural model of the first stage determines static output current of the stage as a function of input voltage to the stage and output voltage of the stage.

8. The method of claim 1 further comprising:

estimating a difference in delay (Dadj) between (a) a timing delay through the first stage using the input waveform, and (b) a timing delay through the first stage using the first EICW;

estimating a delay (Dfinal) through the timing arc, based on a delay estimated by the behavioral timing model and adjusted by Dadj;

determining a second EICW for the last stage having an output slew for an output waveform of the last stage that matches Sfinal;

estimating the output waveform of the timing arc, based on a structural model of the last stage, a load on the last stage, and the second EICW; wherein estimating the output waveform comprises estimating a coupled interconnect delay for the timing arc based on the structural model of the last stage; the load on the last stage, and the second EICW; and modifying a design of an integrated circuit containing the multi-stage cell based on at least one of: the estimated output slew Sfinal, the estimated delay Dfinal, and the estimated output waveform.

9. A non-transitory computer readable medium comprising stored instructions, which when executed by a processor, cause the processor to perform a method comprising:

determining an equivalent input characterization waveform (EICW) for a channel-connected block (CCB) on a boundary of a cell, wherein a timing arc through the cell comprises a series of at least three channel-connected blocks including channel-connected blocks not on the boundary of the cell; and wherein the EICW belongs to a set of waveforms on which a behavioral timing model for the multi-stage cell is based, and the EICW and an actual waveform of interest produce matching timing characteristics of the CCB according to structural model of the CCB; and estimating a timing response of the multi-stage cell based on applying the EICW.

10. The computer readable medium of claim 9 wherein the estimated timing response comprises an output slew of an output waveform of the timing arc and a delay through the timing arc.

11. The computer readable medium of claim 9 wherein the estimated timing response comprises an output waveform of the timing arc.

12. The computer readable medium of claim 9 wherein the method further comprises:

modifying a design of an integrated circuit based on the estimated timing response.

13. A system comprising:

a non-transitory computer readable storage medium storing instructions; and a processor, coupled with the storage medium and to execute the instructions, the instructions when executed cause the processor to:

determine an equivalent input characterization waveform (EICW) for a channel-connected block (CCB) on a boundary of a cell, wherein a timing arc through the cell comprises a series of at least three channel-connected blocks including channel-connected blocks not on the boundary of the cell; and wherein the EICW belongs to a set of waveforms on which a behavioral timing model for the multi-stage cell is based, and the EICW and an actual waveform of interest produce matching timing characteristics of the CCB according to structural model of the CCB; and estimate a timing response of the multi-stage cell based on applying the EICW.

14. The system of claim 13 wherein:

the CCB is a first stage of a timing arc through the multi-stage cell;

the set of waveforms is parameterized by an input slew (Sin 2) to the first stage of the timing arc through the multi-stage cell;

determining the EICW comprises:

estimating an output slew Sout1 of an output waveform of the first stage, based on the structural model of the first stage and an input waveform; and determining the EICW using a lookup table of input slew Sin 2 as a function of output slew (Sout2), by using Sout1 as the value of Sout2 in the lookup table; and estimating the timing response of the multi-stage cell comprises:

estimating an output slew (Sfinal) of an output waveform of the timing arc, based on applying the EICW to the behavioral timing model of the multi-stage cell.

15. The system of claim 13 wherein:

the CCB is a first stage of a timing arc through the multi-stage cell; and estimating the timing response of the multi-stage cell comprises:

estimating an output slew Sout1 of an output waveform of the first stage, based on the structural model of the first stage and an input waveform;

determining a delay Dout2 using a lookup table of delay (Dout2) as a function of an output slew (Sout2), by using Sout1 as the value of Sout2 in the lookup table;

estimating a delay (Dout1) for the input waveform; and estimating a delay (Dfinal) through the timing arc, based on a delay estimated by the behavioral timing model and adjusted by a difference between delays Dout2 and Dout1.

16. The system of claim 13 wherein:

the CCB is a last stage of a timing arc through the multi-stage cell;

the set of waveforms is parameterized by an input slew (Slast2) to the last stage of the timing arc through the multi-stage cell; and determining the EICW comprises:
  estimating an output slew Sfinal of an output waveform of the timing arc;
  determining the EICW using a lookup table of input slew (Slast2) as a function of an output slew (Sfinal2), by using Sfinal as the value of Sfinal2 in the lookup table; and
estimating the timing response of the multi-stage cell comprises:
  estimating a coupled interconnect delay for the timing arc based on a structural model of the last stage, a load on the last stage, and the EICW.

17. The system of claim 13 wherein the behavioral timing model comprises at least one of NLDM and CCST models of the multi-stage cell, and the structural model comprises CCSN models of first and last stages of the multi-stage cell.

18. The system of claim 13 wherein the instructions when executed further cause the processor to modify a design of the multi-stage cell based on the estimated timing response of the integrated circuit.

* * * * *